Patented Apr. 18, 1944

2,347,151

UNITED STATES PATENT OFFICE 2,347,151

PRODUCTION OF HYPOHALOUS ACID SOLUTIONS

Chester C. Crawford, Berkeley, and Theodore W. Evans, Oakland, Calif., assignors to Shell Development Company, San Francisco, Calif., a corporation of Delaware No Drawing. Application April 30, 1940, Serial No. 332,604

8 Claims. (Cl. 23—152)

The present invention relates to the preparation of hypohalous acids, and more particularly pertains to a novel process of preparing hypochlorous acid solutions which are substantially free from halide ions, such as chloride ions.

Hypochlorous acid, usually in the form of its aqueous solutions, is employed in a relatively large number of chemical and industrial processes. For example, in the production of organic halohydrins, a hypochlorous acid solution is interacted with unsaturated organic compounds, which include the olefins, such as ethylene, propylene, butylenes, amylenes, and the like, members of the acetylene series as acetylene, propine, butine, and their homologues, diolefins, such as allene, butadiene, isoprene, alcohols as cinnamyl alcohol, aldehydes and ketones as acrolein, coumarin and ketenes, halides as vinyl chloride, allyl bromide, allyl chloride, methallyl chloride, acetylene dichloride, and the like, and their homologues and analogues. Also, hypochlorous acid is sometimes employed for the manufacture of bleaching powders, particularly when it is desired to produce high-grade bleaching powders which are substantially free from various undesirable impurities.

One of the common methods of synthesis of a hypohalous acid includes the reaction between water and a halogen. For instance, the production of hypochlorous acid by the reaction of chlorine and water follows the equation

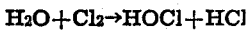

$$H_2O + Cl_2 \rightarrow HOCl + HCl$$

In order to neutralize the hypochloride acid formed as a result of the aforementioned reaction, it is customary to employ an alkali, such as sodium or calcium hydroxide, or the like. The addition of such alkali neutralizes the hydrochloric acid, but simultaneously forms an inorganic halide, which, in most cases, is water-soluble, thus forming an aqueous hypochlorous acid solution containing a greater or lesser concentration of halide ions. The presence of this inorganic halide in the hypochlorous acid is frequently highly undesirable. This is particularly true when the hypochlorous acid is employed for the chlorhydrination of unsaturated organic compounds of the class defined hereinabove, it being noted that the presence of halide ions in aqueous hypochlorous acid solutions tends to form undesirable by-products of the type of organic halides or polyhalides, when such hypochlorous acid solutions are employed as one of the reactants in the above-mentioned chlorhydrination reactions. For instance, when allyl chloride is intimately commingled with an aqueous hypochlorous acid solution containing such free chloride ions, the reaction products contain excessive quantities of organic chlorides of the type of trichlorpropane and tetrachlorpropyl ether. Similarly, the reaction between ethylene and these chloride ions containing aqueous solutions of hypochlorous acid, instead of producing quantitative yields of ethylene chlorhydrin, also results in the formation of ethylene dichloride. In fact, even when the chlorhydrination of unsaturated organic compounds with such aqueous hydrochlorous acid solutions containing halide ions is effected under the most optimum conditions, the reaction products still contain relatively high percentages of organic halides.

It is therefore the main object of the present invention to provide a process for the efficient and economic production of hypochlorous acids which are free from or which contain only very limited quantities of inorganic halides. A further object is to provide a process for the production of aqueous hypochlorous acid solutions which are substantially free from chloride ions. A still further object is to produce relatively concentrated aqueous hypochlorous acid solutions substantially free from chloride ions.

It has now been discovered that aqueous hypochlorous acid solutions containing halide ions may be effectively treated for the recovery of aqueous hypochlorous acid solutions substantially free from, or containing only small and relatively negligible concentrations of the halide ion, by subjecting such halide ion-containing solutions to a distillation in the presence of a halogen gas. It has been further discovered that by distilling the aqueous hypochlorous acid solution containing the halide ions, in the presence of a halogen gas and, preferably, in the presence of steam or of another inert gaseous or vaporous substance, it is possible to obtain a substantially quantitative and highly efficient recovery of the hypochlorous acid while leaving the inorganic halides in the undistilled fraction.

The distillation according to the present invention is generally effected at a temperature of about 100° C. Although atmospheric pressures may be employed, the distillation may also be made under reduced pressures, which will naturally vary the degree of heating necessary for the distillation of the hypochlorous acid. Ordinary distillation, whether in the presence or absence of steam, however, is undesirable because at such distillation temperatures the reaction favors the liberation of excessive quantities of chlorine gas with the concurrent formation of hypochlorites and chlorates. The latter are naturally non-distillable and, therefore, become a total loss so far as the yield of hypochlorous acid is concerned. In order to decrease this loss by conversion of some of the hypochlorous acid into the corresponding hypochlorite and chlorate salts, the process of the present invention provides for the maintenance of a relatively high halogen gas concentration in the vapor phase evolved during the distillation operation. For this purpose, the distillation is effectively realized by the distillation of the aqueous hypochlorous acid solutions containing halide ions (chloride ions), with the concurrent passage of halogen gas through the distillation zone. In fact, in order to obtain substantially quantitative yields of the hypochlorous acid, it is desirable, if not essential, to employ a high concentration of the free halogen in the distillation or stripping column. Furthermore, it is desirable to maintain the aqueous hypochlorous acid solution subjected to the distillation in accordance with the process of the present invention in an acidic state, preferably in the vicinity of a pH of 3 or 4. Somewhat lower and higher pH values may be employed without considerable impairment of the yields, as this will be obvious from the examples presented hereinbelow. However, in order to obtain optimum yields, it is best to operate at a pH of below about 5, and preferably within the aforementioned pH range in the vicinity of 3 and 4.

The distillation according to the present invention may be effected in a batch, intermittent or continuous manner. For example, the halide-containing aqueous hypochlorous acid solution may be fed continuously into a heat insulated distillation or stripping column countercurrent to a rising stream of steam and a halogen gas, such as chlorine. In a preferred embodiment, the feed of the halide-containing solution may be made at some intermediate point of the column, while the steam and the halogen gas are introduced substantially at or near the base thereof. The undistilled fraction, comprising an aqueous solution of the inorganic halide or halides (such as the chlorides) present in the starting material may be withdrawn intermittently or continuously from the bottom of the tower or column. The overhead fraction leaving the top of the column may be treated (as by cooling) to separate the halogen gas which may then be recycled back into and through the column. In the alternative, the separation of the free halogen gas may be effected by the use of caustic alkali, such as sodium hydroxide or the like, capable of reacting with the halogen gas to form a salt (e. g. sodium chloride). The remaining distillate, after condensation, comprises an aqueous solution of hypochlorous acid, this solution being substantially free from halide ions.

As noted above, an important feature of the present process of preparing and recovering an aqueous hypochlorous acid solution substantially free from or containing only limited quantities of halide ions resides in the fact that it is possible to obtain a solution having a hypochlorous acid concentration greater than that of the feed material. Furthermore, these aqueous hypochlorous acid solutions which are substantially free from the presence of halide ions, are highly stable and do not decompose materially even when allowed to stand in the light. For example, the distillation of an aqueous solution containing 0.5 M HOCl and sodium chloride, when effected according to the present process, produced an aqueous solution containing more than 0.7 M of hypochlorous acid, this solution being substantially free from or containing only a very low chloride ion concentration. This solution was quite stable. Thus, a sample of a distillate produced according to the present invention and originally having a 0.73 M HOCl concentration, upon standing for three days without any protection from light, etc., was found to have a 0.71 M HOCl concentration. In other words, only 0.02 M of the hypochlorous acid decomposed. On the other hand, hypochlorous acid solutions containing sodium chloride or like halides, when allowed to stand in the light, decompose very rapidly so that it is frequently necessary to prepare such chloride ion-containing aqueous hypochlorous acid solutions immediately before their utilization, and not to allow them to stand for any appreciable length of time.

Although the above disclosure was made with particular reference to the use of sodium hydroxide for the neutralization of the hydrochloric acid formed as a by-product during the preparation of the hypochlorous acid, it is possible to use the hydroxides of other metals, such as the other alkali metals, the alkaline earth metals, and the like. Naturally, the salts formed during such neutralization will be different. However, when such salts are soluble in water, the aqueous hypochlorous acid solution will contain the undesirable free chloride ions. Therefore, the process of the present invention is applicable to the treatment of aqueous hypochlorous acid solutions containing water-soluble halide (e. g. chloride) salts, and the recovery therefrom of solutions which are substantially free from the halide ions.

The following examples will serve to indicate the operation of the present invention, it being understood that there is no intention of being limited by any details of operation, such as temperature, pressure, concentrations of the starting material and of final distillate, etc., the invention being co-extensive in scope with the appended claims.

*Example I*

An aqueous hypochlorous acid solution prepared by the interaction of chlorine, water and sodium hydroxide, and therefore containing sodium chloride in solution, was distilled in a four-foot stripping column filled with 10 mm. glass beads. The column was surrounded with a steam jacket to minimize heat losses. The distillation was effected by introducing the above starting material at an intermediate point in the column, while steam was continuously fed into the lower portion thereof. In this experiment no halogen gas, such as chlorine, was introduced. The starting material had a molar hypochlorous acid concentration of about 0.5. The overhead vaporous fraction was cooled to condense the aqueous hypochlorous acid solution, the remaining uncondensed gases, comprising free chlorine evolved during the distillation step, being then condensed in a cold trap. An analysis of the distillate fraction and of the residual fraction withdrawn from the bottom of the column, showed that only about 58.5% of the potential chlorine in the starting material was recovered as hypochlorous acid, the distillate also containing about 2.3% of the potential chlorine dissolved in said distillate as free chlorine. Also, about 17.9% of this chlorine was recovered as free chlorine from the aforementioned cold trap, while about 21.3% was converted to the undesirable hypochlorite and chlorate salts. In other words, only about 78.7% of the available chlorine was recovered as useful products, i. e. hypochlorous acid and free chlorine which latter could be easily re-used to prepare additional starting material.

*Example II*

An aqueous hypochlorous acid solution in a molar concentration of about 0.5 and containing soduim chloride was subjected to a distillation in the same apparatus and under the same conditions as in Example I with the exception that chlorine gas was introduced into the system together with the steam. A total of about 0.6 mol of chlorine were thus introduced. The overhead vaporous fraction was fractionally condensed to separately recover the aqueous hypochlorous acid and the free chlorine. An analysis of the distillate and of the residual fraction showed that about 72.9% of the potential chlorine in the starting material was recovered as hypochlorous acid, the distillate containing 2.7% free chlorine dissolved therein. Only about 8.8% of the chlorine was found in the residual fraction in the form of the undesirable hypochlorite and chlorate salts, while about 15.6% of the chlorine in the original hypochlorous acid solution was recovered as free chlorine. From the above, it is seen that 91.2% of the available chlorine was recovered as useful products, as compared to only 78.7% recovery when the distillation was effected in the absence of any introduction of chlorine gas.

*Example III*

An aqueous solution containing sodium chloride and hypochlorous acid in a molar concentration of about 0.27 was distilled with steam and in an atmosphere of chlorine. This aqueous solution had a pH value of between about 3.4 and 3.5. The distribution of the products was as follows, the percentages being calculated on the potential chlorine in the feed:

| | Per cent |
|---|---|
| Distillate | 93.1 |
| Water trap | 4.4 |
| Residue | 2.5 |

The aqueous distillate was tested for hypochlorite and chlorate salts, but none were found. The distillate contained some free chlorine dissolved therein. The molar concentration of the hypochlorous acid in the overhead distillate was about 0.498.

*Example IV*

A crude hypochlorous acid containing solution was first prepared by employing a lime slurry as the initial alkali, the molarity of the lime slurry being 0.13. This solution was then distilled with steam and in the presence of chlorine which was introduced together with the steam into the stripping column. In this experiment about 2.1 mols of chlorine were thus introduced per mol of hypochlorous acid recovered in the distillate. An analysis of the various fractions thus obtained showed that about 77.7% of the potential chlorine in the starting material was recovered as hypochlorous acid in the overhead distillate which also contained about 5.3% free chlorine dissolved therein. Only about 4.6% of the potential chlorine was found to have been converted to the undesirable hypochlorite and chlorate salts, while about 6.9% was recovered as free chlorine from the cold trap, and about 5.5% from the water trap.

An analysis of the above data shows the advantages derived from operating in accordance with the process of the present invention, it being noted that high yields of aqueous hypochlorous acid solutions containing substantially no free chloride ions may be obtained when the distillation is effected in the presence of chlorine gas.

Although the above disclosure and examples are specific to the production of aqeuous hypochlorous acid solutions which are substantially free from halide ions, it is to be understood that the present process may also be employed for the formation of substantially pure hypobromous acid solutions from mixtures containing water soluble halide salts, the distillation in such case being preferably effected in an atmosphere of bromine gas.

This application is a continuation-in-part of our co-pending application Serial No. 285,026 filed July 17, 1939.

We claim as our invention:

1. In a method of recovering a substantially pure aqueous hypochlorous acid solution from an aqueous solution containing the hypochlorous acid and sodium chloride, the steps of conditioning said solution to a pH value in the neighborhood of 3 and 4, adding chlorine gas, and subjecting said solution to steam distillation in an atmosphere of said added chlorine gas, thereby inhibiting the conversion of said hypochlorous acid to sodium hypochlorite, and simultaneously recovering a distillate comprising the aqueous hypochlorous acid substantially free from chloride ions.

2. In a method of recovering aqueous hypochlorous acid from a solution containing hypochlorous acid and sodium chloride, the step of steam distilling said solution in the presence of deliberately added chlorine gas, thereby recovering an aqueous hypochlorous acid solution substantially free from chloride ions while simultaneously inhibiting the conversion of the acid to sodium hypochlorite.

3. In a method of recovering aqueous hypochlorous acid from a solution containing said acid and a water-soluble alkaline chloride salt, the step of distilling said solution in the presence of deliberately added chlorine gas, thereby recovering a distillate comprising the aqueous hypochlorous acid substantially free from chloride ions while substantially inhibiting the conversion of the acid to the corresponding alkali hypochlorite salt.

4. The method according to claim 3 wherein the solution subjected to the distillation is maintained at a pH of below 5.

5. In a method of recovering aqueous hypochlorous acid from a solution containing the hypochlorous acid and a water-soluble chloride salt, the step of distilling said solution in the presence of deliberately added chlorine gas, thereby inhibiting the conversion of the acid to the corresponding hypochlorite salt, and recovering a distillate comprising the aqueous hypochlorous acid substantially free from chloride ions.

6. In a method of recovering an aqueous hypohalous acid solution free from halide ions, the steps of distilling an aqueous solution containing halide ions and a hypohalous acid selected from the group of hypochlorous and hypobromous acids, effecting said distillation in the presence of a deliberately added halogen gas, said halogen being identical with the halogen of the hypohalous acid subjected to the distillation step, and recovering a distillate comprising said aqueous hypohalus acid substantially free from halide ions.

7. In a method of recovering aqueous hypochlorous acid from a solution containing hypochlorous acid and a water-soluble alkaline chloride salt, the step of distilling said solution in the presence of deliberately added chlorine gas and of a vaporous substance which is inert under the operating conditions, thereby recovering a distillate comprising the aqueous hypochlorous acid substantially free from chloride ions while substantially inhibiting the conversion of the acid to the corresponding alkali hypochlorite salt.

8. In a method of recovering an aqueous hypohalous acid solution free from halide ions, the steps of distilling an aqueous solution containing halide ions and a hypohalous acid selected from the group of hypochlorous and hypobromous acids, effecting said distillation in the presence of a deliberately added halogen gas identical with the halogen of the hypohalous acid subjected to distillation, and of a vaporous substance which is inert under the operating conditions, and recovering a distillate comprising said aqueous hypohalous acid substantially free from halide ions.

CHESTER C. CRAWFORD.
THEODORE W. EVANS.